Feb. 28, 1939.      R. R. STITT      2,149,106
TRACTOR TRAILER BRAKE CONTROL SYSTEM
Filed Aug. 3, 1934      3 Sheets-Sheet 1
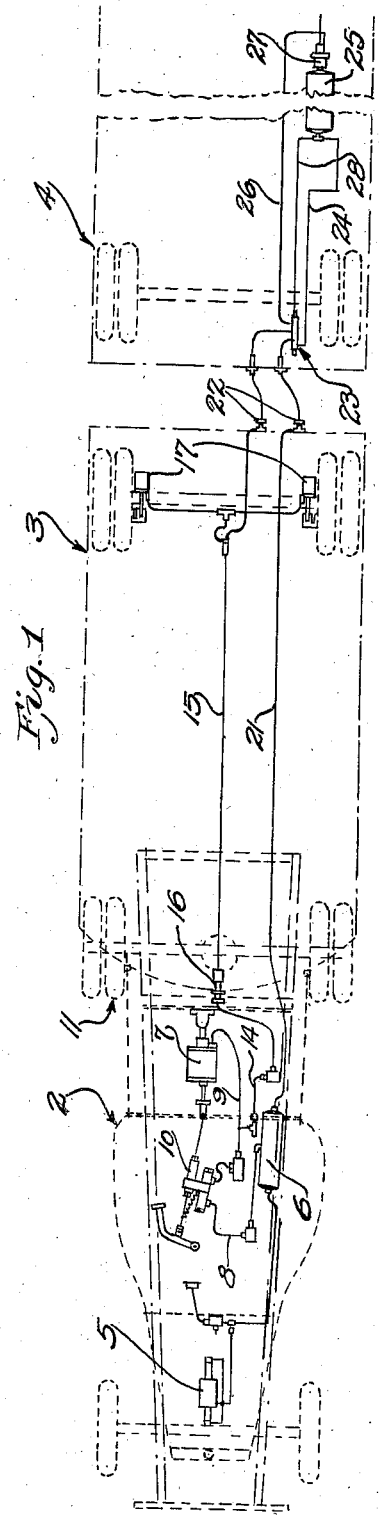
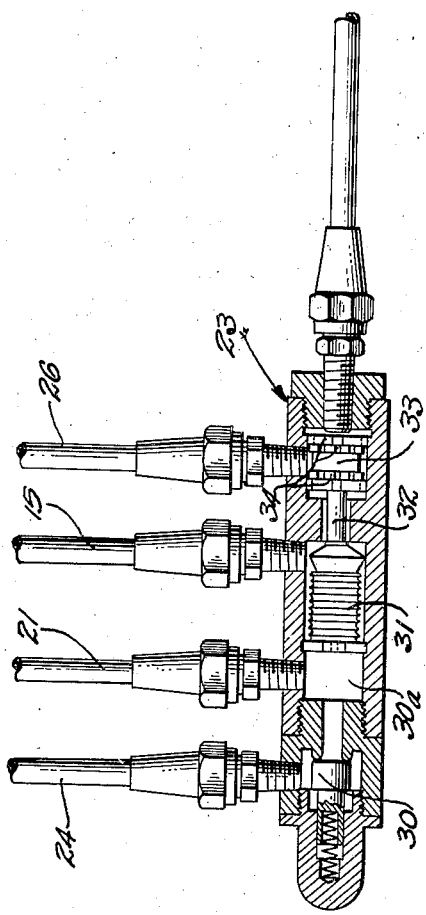
INVENTOR.
ROSCOE R. STITT
BY
Barnes, Kisselle, Laughlin & Raisch
ATTORNEYS

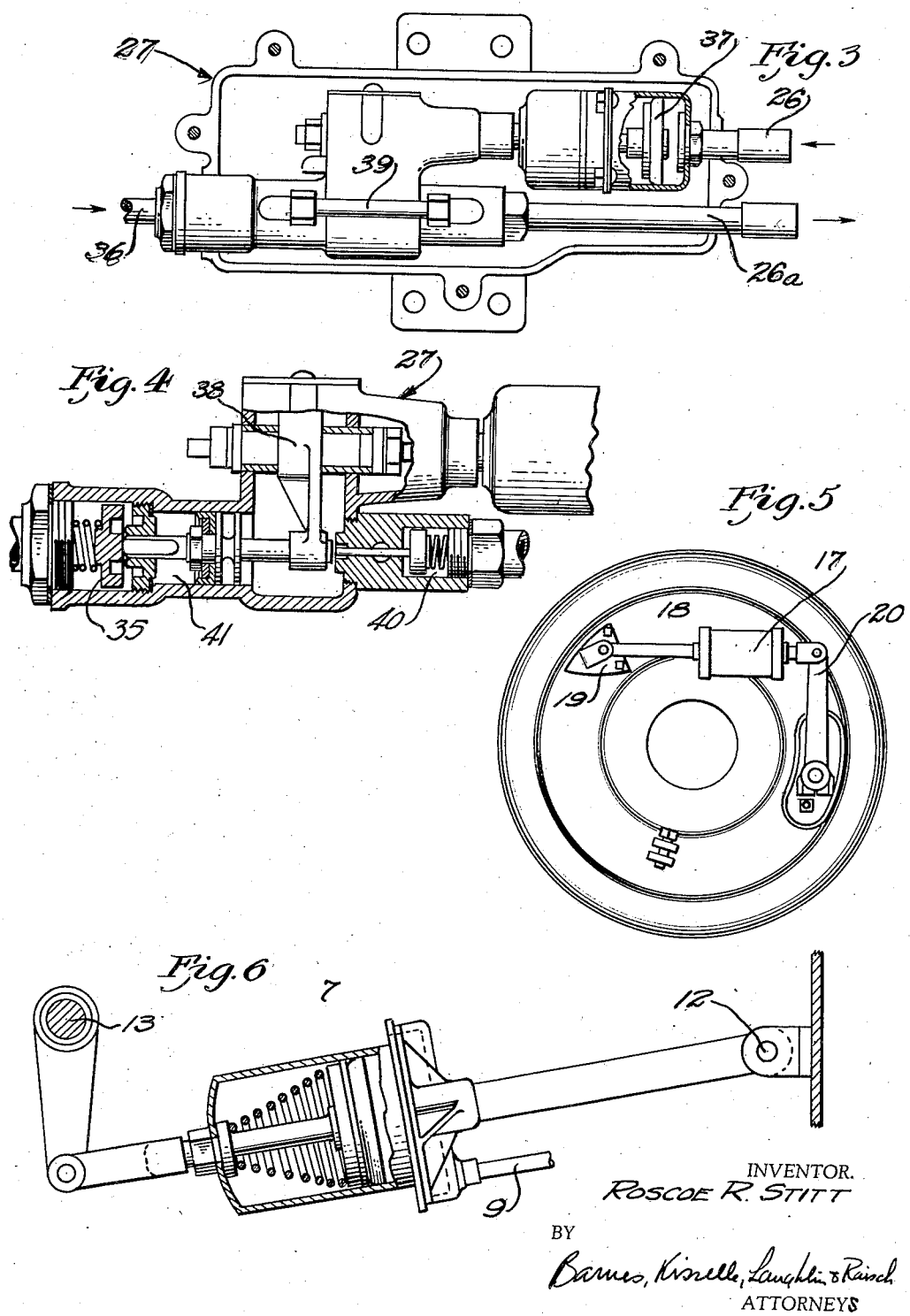

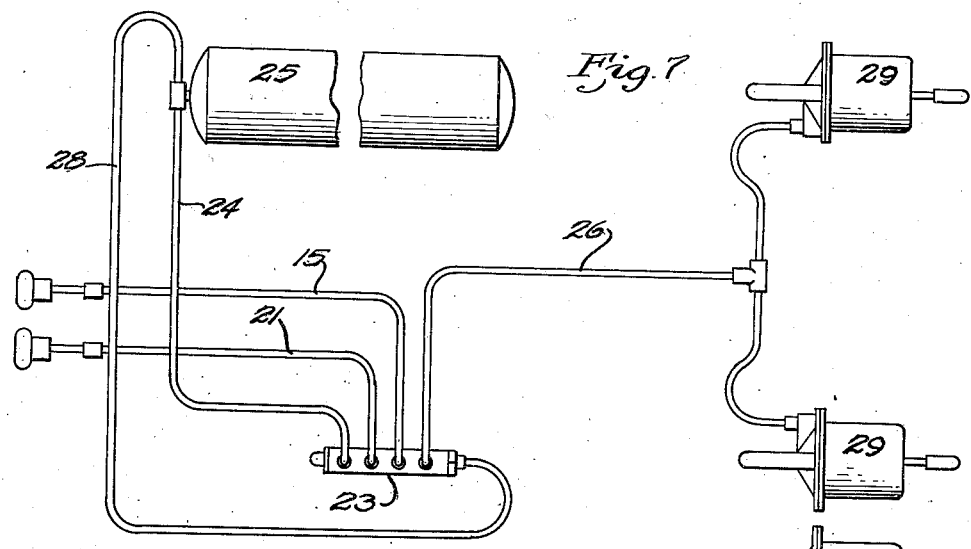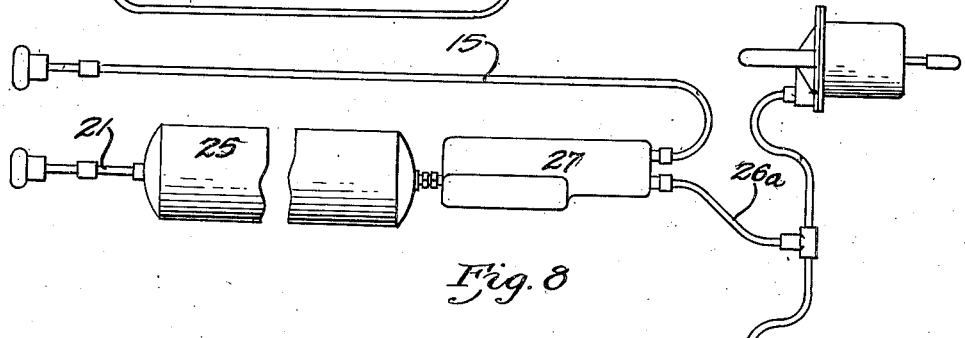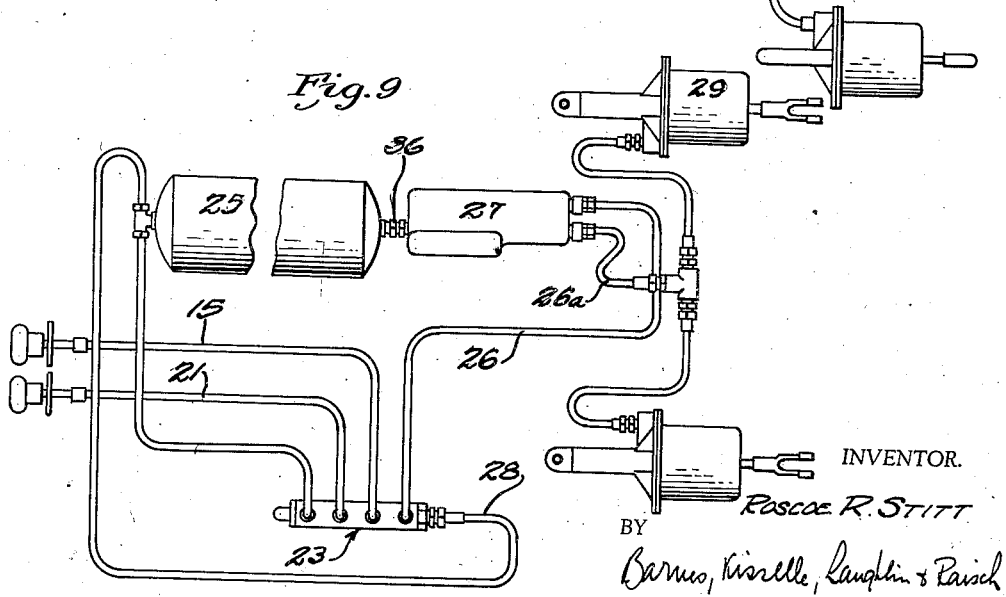

Patented Feb. 28, 1939

2,149,106

UNITED STATES PATENT OFFICE 2,149,106

TRACTOR TRAILER BRAKE CONTROL SYSTEM

Roscoe R. Stitt, Detroit, Mich., assignor to Automotive Air Brake Co. Inc., Kokomo, Ind., a corporation of Michigan Application August 3, 1934, Serial No. 738,324

6 Claims. (Cl. 303—26)

This invention relates to a tractor-trailer brake control system, and has to do more particularly with a tractor-trailer or a tractor-semitrailer combination.

The present invention is particularly adapted to vehicle braking mechanism of the type having a source of fluid power, compressed air, vacuum, etc., and a fluid control or foot metering valve means for controlling the application of fluid power to the brakes. An important feature of the present invention has to do with emergency hook-up means in combination with a multiple braking system wherein the main line fluid supply is utilized for braking the tractor and a semitrailer (where the latter is used) and an auxiliary reservoir means is adapted to work in combination with the emergency means for applying the brakes upon failure of fluid power or line breakage.

Other features include a remote control valve working alone or in combination with the emergency valve for controlling the application of the trailer brakes from an auxiliary reservoir supply means instead of the main line supply means. Other features have to do with details of construction, particularly details of the emergency valve, remote control valve, and the combination between the two.

In the drawings:

Fig. 1 is a diagrammatic plan view of a tractor-semitrailer-trailer combination embodying my novel brake system.

Fig. 2 is an enlarged partially sectional view of my preferred form of emergency valve viewed between the semitrailer and trailer.

Fig. 3 is an enlarged elevation partly in section of the remote control valve used for controlling the application of fluid pressure to the trailer brakes.

Fig. 4 is a sectional view of a portion of the structure shown in Fig. 3.

Fig. 5 is an elevation illustrating the manner of mounting the brake cylinder on the backing plate, such as used on the rear wheels of the semitrailer in Fig. 1.

Fig. 6 is an enlarged partly sectional view of the main braking cylinder as used for applying the brakes on the tractor.

Figs. 7 to 9 illustrate respectively an emergency hook-up alone with the auxiliary reservoir, the remote control hook-up alone with the auxiliary reservoir, and the combined remote control and emergency hook-up.

In the illustrated embodiment of the invention, a standard tractor unit is diagrammatically shown as at 2, a semitrailer as at 3 and a trailer as at 4. Although any source of fluid supply may be used for actuating the brakes, I have diagrammatically shown a compressor unit 5, preferably of the type shown in my application No. 639,647, filed October 26, 1932.

Compressed air from the compressor 5 may be received and stored in a main trailer reservoir 6. Flow of compressed air from the reservoir 6 to a power cylinder 7 through conduits 8 and 9 may be controlled and metered by a floating follow-up type control valve 10 of the general type illustrated and described in my application No. 591,826, filed February 9, 1932. Actuation of the power cylinder 7 controls the application of the regular brakes to the rear wheels 11 of the tractor. Such brake power cylinder 7 is more clearly shown in Fig. 6 and includes the fixed pivotal mounting 12 and brake cross shaft 13. The conduit 9 may be provided with a branch connection 14 which is connected to what might be termed a foot valve or straight air line 15 on the semitrailer by means of a suitable hose connection 16. Inasmuch as the semitrailer 3 forms really an integral part of the tractor through the usual fifth wheel connection, the actuation of the valve 10 to supply air from the reservoir 6 to the power cylinder 7 will simultaneously supply air through the lines 14 and 15 to apply the brakes on the wheels of the semitrailer by means of the brake cylinders 17. Such type of brake cylinder is more clearly illustrated in Fig. 5. Here the brake cylinder is mounted direct to the backing plate 18 of the brake housing so that the cylinder floats between a bracket 19 and the brake actuating lever 20.

A semitrailer also carries a tractor reservoir or emergency line 21 and both the foot valve line 15 and the tractor reservoir line 21 are connected by suitable hose connectors 22 with the full trailer 4 and emergency valve 23 carried by the trailer. As best shown in Figs. 2, 7 and 9, the emergency valve is provided with a plurality of conduits two of which are the tractor reservoir conduit 21 and the foot valve line 15. A third conduit 24 connects into a trailer reservoir 25, a fourth conduit 26 connects to the brakes of the trailer either directly or through a relay or remote control valve 27. A fifth conduit 28 also connects to the trailer reservoir 25. The line 26 in the form shown in Fig. 7 connects into brake cylinders 29 of the same general type as that shown in Fig. 5, such brake cylinders being connected to the brake drum of the rear wheels or both sets of wheels of the trailers.

As best shown in Fig. 2, lines 21 and 24 leading to the emergency valve 23 are normally separated by a spring pressed valve 30. A bellows member 31 is exteriorly subjected to pressure from the line 15 and this bellows member has a valve stem 32 acting upon a valve 33, said valve being provided with serrated peripheries as at 34.

In operation, the emergency valve 23 functions as a positive control member for all the trailer equipment represented by the numeral 4 and also acts to equalize the main air supply and the air supply in the trailer or trailers. The spring pressed valve 30 is backed by a spring of predetermined pressure, preferably about five pounds, the chamber 30a is constantly subjected to air from the tractor reservoir line 21 so that any pressure over five pounds will be conducted through the line 24 to the trailer reservoir 25. It will thus be obvious that pressure in the trailer reservoir 25 will be maintained about five pounds less than the general pressure existing in the supply line 21. Upon actuation of the foot control valve 10, air released from the main cylinder 6 will be transmitted through the conduit 15 into the chamber of the emergency valve containing the bellows member 31. Inasmuch as the normal pressure in the chamber 30a will maintain the bellows member extended to the right and hence retain the valve 33 in the right hand position as viewed in Fig. 2, it will be seen that air released by the operation of the foot valve 10 will pass into the emergency valve, around the valve stem 32, past the serrations 34 and through the conduit 26 into the brake operating cylinders 29 of the trailer, that is, when the combination as shown in Fig. 7 is used in the trailer. When the control valve 10 is released, operating air in the trailer will be released in the regular manner. Inasmuch as the main reservoir line 21 as connected into the emergency valve (see Fig. 2) has a greater pressure than the foot valve line 15, it will be seen that the bellows member 31 will always be extended under normal operations.

If, for any reason, the main line 21 should break, as when the tractor and trailer are disconnected, or for failure of air supply, then the pressure stored up in the reservoir 25 will force the valve 33 to the left, if it has not already been forced to the left, as viewed in Fig. 2, and air pressure will be admitted through the conduit 28, past the serrations of the valve 33 and into the brake operating conduit 26, applying emergency air to brake the trailer. The trailer brakes 29 will remain set until such time as the conduit 21 is again connected to the main air supply or the main air supply is restored. When such connection has been restored, the pressure will gradually build up against the bellows member 31 with the result that the valve 33 will again be moved to the right, closing the line 28, releasing the pressure in the brake cylinders and consequently releasing the trailer brakes. This arrangement provides absolute safety on the highway, prevents the trailer from running away under any conditions whether connected to the semitrailer or tractor or released.

In most installations I prefer to use a remote control valve 27, illustrated in detail in Figs. 3 and 4 and similar in construction and operation to the control valve 10. The inlet valve for the control valve 27 is at 35 and a chamber surrounding this inlet valve 35 is directly connected to the trailer reservoir 25 by means of a conduit 36. Brake actuating air through the line 26 from the emergency valve (in the combination illustrated in Fig. 9) is connected to the right hand end of the remote control valve as shown in Fig. 3, and this actuating air, acting through the medium of a piston 37, controls the movement of an actuating finger 38 to control the metering valve 27. As more fully explained in my copending application 591,826, actuation of the finger 38 will open the valve 35 and admit air under pressure through the valve through the by-pass 39 and into the brake actuating line 26a. Release of the foot valve 10, and, indirectly, release of the operating finger 38 will allow the brake cylinders to exhaust through an exhaust chamber 40. Actuating air and exhaust air pass through a differential cylinder 41, as more fully explained in said copending application, so as to obtain a positive metering action. By the arrangement as shown in Fig. 9, it will be seen that air from the trailer reservoir 25 will be used in applying the trailer brakes rather than using the air from the line 15. This idea of applying brake power on the trailer by air from the trailer reservoir instead of the tractor reservoir will give much more efficient and greater braking action. The use of this remote control valve reduces a lag in brake application and release and allows the brakes on the rear trailer to be applied before the semitrailer brakes.

The size of the piston 37 is predetermined to assist in giving this greater brake application to the trailer, for instance, five pounds on the front brakes would not produce enough braking pressure for the semitrailer brakes because of the friction of the control line and the remoteness of the brake cylinders, but through the adjacent location of the trailer reservoir 25 and the size of the piston 37, fifteen pounds pressure can be applied to the trailer brakes.

If desired, the emergency valve may be dispensed with in which case, as best shown in Fig. 8, the foot valve line 15 may be directly connected to the remote control valve 27, and the tractor reservoir line 21 directly connected to the trailer reservoir 25.

What I claim is:—

1. In a fluid braking system for a plurality of vehicles, of the type having a main vehicle, a source of fluid supply, a main vehicle reservoir, a valve for controlling the application of braking fluid from said main reservoir to a braking cylinder or cylinders on the main vehicle, a trailer vehicle propelled by said main vehicle, a reservoir carried by said trailer, an emergency valve carried by said trailer, and separate conduits connecting the control valve, the main reservoir, the trailer reservoir and the trailer braking cylinder or cylinders with said emergency valve, said emergency valve being so constructed as to prevent operation of the trailer braking cylinder by the trailer reservoir coincident with the normal operation of the main vehicle and trailer braking cylinders but operating, only upon breakage of the fluid supply line and failure of the main fluid supply, to automatically connect the trailer reservoir with the trailer braking cylinders to set the trailer brakes, said emergency valve including a spring pressed check valve of predetermined tension whereby the pressure stored in said trailer reservoir is slightly less than the pressure stored in said main vehicle reservoir, said emergency valve including a bellows operated valve member normally maintained in position by the main fluid supply whereby to connect the control valve fluid supply with the trailer brake cylinders, said bellows member being opposed by a fluid pressure from the trailer reservoir whereby, when the main pressure line fails, said last named valve will be shifted and fluid pressure from the trailer reservoir directed to the trailer braking cylinders.

2. In a fluid braking system for a plurality of vehicles, of the type having a main vehicle, a source of fluid supply, a main vehicle reservoir, a valve for controlling the application of braking fluid from said main reservoir to a braking cylinder or cylinders on the main vehicle, a trailer vehicle propelled by said main vehicle, a reservoir carried by said trailer, an emergency valve carried by said trailer, and separate conduits connecting the control valve, the main reservoir, the trailer reservoir and the trailer braking cylinder or cylinders with said emergency valve, said emergency valve being so constructed as to prevent operation of the trailer braking cylinder by the trailer reservoir coincident with the normal operation of the main vehicle and trailer braking cylinders but operating, only upon breakage of the fluid supply line and failure of the main fluid supply, to automatically connect the trailer reservoir with the trailer braking cylinders to set the trailer brakes until the main fluid supply line leading into the emergency valve builds up an operating pressure, said emergency valve including a spring pressed check valve of predetermined tension whereby the pressure stored in said trailer reservoir is slightly less than the pressure stored in said main vehicle reservoir, said emergency valve including a bellows operated valve member normally maintained in position by the main fluid supply whereby to connect the control valve fluid supply with the trailer brake cylinders, said bellows member being opposed by a fluid pressure from the trailer reservoir whereby when the main pressure line fails, said last named valve will be shifted and fluid pressure from the trailer reservoir directed to the trailer braking cylinders.

3. In a fluid braking system for a plurality of vehicles, the combination of a main vehicle, a source of fluid supply, a main vehicle reservoir, a valve for controlling the application of braking fluid from said main reservoir to a braking cylinder or cylinders on the main vehicle, a trailer vehicle propelled by said main vehicle, a reservoir carried by said trailer, an emergency valve carried by said trailer, separate conduits connecting the control valve, the main reservoir, the trailer reservoir and the trailer braking cylinder or cylinders with said emergency valve, said emergency valve being so constructed as to prevent operation of the trailer braking cylinder by the trailer reservoir coincident with the normal operation of the main vehicle and trailer braking cylinders but operating, upon breakage of the fluid supply line and failure of the main fluid supply, to automatically connect the trailer reservoir with the trailer braking cylinders to set the trailer brakes, said emergency valve including a spring pressed check valve of predetermined tension whereby the pressure stored in said trailer reservoir is slightly less than the pressure stored in said main vehicle reservoir, said emergency valve including a bellows operated valve member normally maintained in position by the main fluid supply whereby to connect the control valve fluid supply with the trailer brake cylinders, said bellows member being opposed by a fluid pressure from the trailer reservoir whereby, when the main pressure line fails, said last named valve will be shifted and fluid pressure from the trailer reservoir directed to the trailer braking cylinders, a remote control valve interpositioned in the line leading from the emergency valve to the trailer braking cylinders, said remote control valve being actuated by the conduction of fluid pressure from the main vehicle reservoir to the main vehicle brake cylinder, and said remote control valve being connected into said trailer reservoir whereby when said valve is actuated will apply fluid pressure directly from said trailer reservoir to the trailer braking cylinders.

4. In a fluid braking system for a plurality of vehicles, the combination of a main vehicle, a source of fluid supply, a main vehicle reservoir, a valve for controlling the application of braking fluid from said main reservoir to a braking cylinder or cylinders on the main vehicle, a trailer vehicle propelled by said main vehicle, a reservoir carried by said trailer, an emergency valve carried by said trailer, separate conduits connecting the control valve, the main reservoir, the trailer reservoir and the trailer braking cylinder or cylinders with said emergency valve, said emergency valve being so constructed as to prevent operation of the trailer braking cylinder by the trailer reservoir coincident with the normal operation of the main vehicle and trailer braking cylinders but operating, upon breakage of the fluid supply line and failure of the main fluid supply, to automatically connect the trailer reservoir with the trailer braking cylinders to set the trailer brakes until the main fluid supply line leading into the emergency valve builds up an operating pressure, said emergency valve including a spring pressed check valve of predetermined tension whereby the pressure stored in said trailer reservoir is slightly less than the pressure stored in said main vehicle reservoir, said emergency valve including a bellows operated valve member normally maintained in position by the main fluid supply whereby to connect the control valve fluid supply with the trailer brake cylinders, said bellows member being opposed by a fluid pressure from the trailer reservoir whereby when the main pressure line fails, said last named valve will be shifted and fluid pressure from the trailer reservoir directed to the trailer braking cylinders, a remote control valve interpositioned in the line leading from the emergency valve to the trailer braking cylinders, said remote control valve being actuated by the conduction of fluid pressure from the main vehicle reservoir to the main vehicle brake cylinder, and said remote control valve being connected into said trailer reservoir whereby when said valve is actuated will apply fluid pressure directly from said trailer reservoir to the trailer braking cylinders.

5. In a fluid braking system for a plurality of vehicles, the combination of a main vehicle, a source of fluid supply, a main vehicle reservoir, a valve for controlling the application of braking fluid from said main reservoir to a braking cylinder or cylinders on the main vehicle, a trailer vehicle propelled by said main vehicle, a reservoir carried by said trailer, an emergency valve carried by said trailer, separate conduits connecting the control valve, the main reservoir, the trailer reservoir and the trailer braking cylinder or cylinders with said emergency valve, said emergency valve being so constructed as to prevent operation of the trailer braking cylinder by the trailer reservoir coincident with the normal operation of the main vehicle and trailer braking cylinders but operating, upon breakage of the fluid supply line and failure of the main fluid supply, to automatically connect the trailer reservoir with the trailer braking cylinders to set the trailer brakes, said emergency valve including a spring pressed check valve of predetermined tension whereby the pressure stored in said trailer reservoir is slightly less than the pressure stored in said main vehicle reservoir, said emergency valve including a bellows operated valve member normally maintained in position by the main fluid supply whereby to connect the control valve fluid supply with the trailer brake cylinders, said bellows member being opposed by a fluid pressure from the trailer reservoir whereby, when the main pressure line fails, said last named valve will be shifted and fluid pressure from the trailer reservoir directed to the trailer braking cylinders, a remote control valve interpositioned in the line leading from the emergency valve to the trailer braking cylinders, said remote control valve being actuated by the conduction of fluid pressure from the main vehicle reservoir to the main vehicle brake cylinder, and said remote control valve being connected into said trailer reservoir whereby when said valve is actuated will apply fluid pressure directly from said trailer reservoir to the trailer braking cylinders, said remote control valve being piston actuated and said piston being of such size and working in combination with direct application of braking pressure to the trailer brakes from the trailer reservoir whereby to apply a greater braking pressure to the trailer wheels than to the tractor wheels.

6. In a fluid braking system for a plurality of vehicles, the combination of a main vehicle, a source of fluid supply, a main vehicle reservoir, a valve for controlling the application of braking fluid from said main reservoir to a braking cylinder or cylinders on the main vehicle, a trailer vehicle propelled by said main vehicle, a reservoir carried by said trailer, an emergency valve carried by said trailer, separate conduits connecting the control valve, the main reservoir, the trailer reservoir and the trailer braking cylinder or cylinders with said emergency valve, said emergency valve being so constructed as to prevent operation of the trailer braking cylinder by the trailer reservoir coincident with the normal operation of the main vehicle and trailer braking cylinders but operating, upon breakage of the fluid supply line and failure of the main fluid supply, to automatically connect the trailer reservoir with the trailer braking cylinders to set the trailer brakes until the main fluid supply line leading into the emergency valve builds up an operating pressure, said emergency valve including a spring pressed check valve of predetermined tension whereby the pressure stored in said trailer reservoir is slightly less than the pressure stored in said main vehicle reservoir, said emergency valve including a bellows operated valve member normally maintained in position by the main fluid supply whereby to connect the control valve fluid supply with the trailer brake cylinders, said bellows member being opposed by a fluid pressure from the trailer reservoir whereby when the main pressure line fails, said last named valve will be shifted and fluid pressure from the trailer reservoir directed to the trailer braking cylinders, a remote control valve interpositioned in the line leading from the emergency valve to the trailer braking cylinders, said remote control valve being actuated by the conduction of fluid pressure from the main vehicle reservoir to the main vehicle brake cylinder, and said remote control valve being connected into said trailer reservoir whereby when said valve is actuated it will apply fluid pressure directly from said trailer reservoir to the trailer braking cylinders, said remote control valve being piston actuated and said piston being of such size and working in combination with the direct application of braking pressure to the trailer brakes from the trailer reservoir whereby to apply a greater braking pressure to the trailer wheels than to the tractor wheels.

ROSCOE R. STITT.